Figure 1:
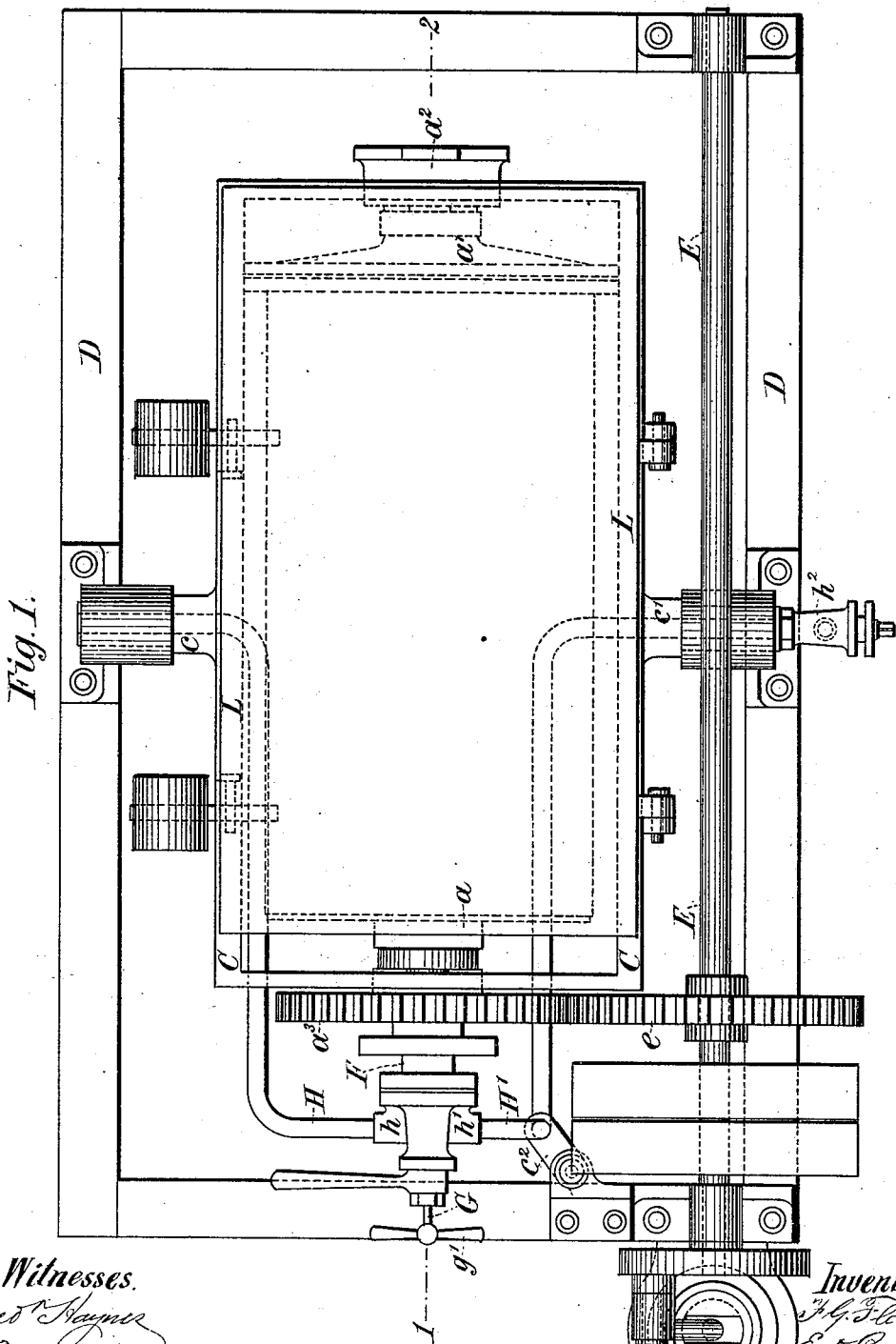

(No Model.) 4 Sheets—Sheet 3.
F. G. FLEURY & E. D. BARKER.
PROCESS OF AND APPARATUS FOR ROASTING COFFEE.
No. 255,965. Patented Apr. 4, 1882.

Witnesses. Inventors (No Model.) 4 Sheets—Sheet 4.
F. G. FLEURY & E. D. BARKER.
PROCESS OF AND APPARATUS FOR ROASTING COFFEE.

No. 255,965. Patented Apr. 4, 1882.

Witnesses Inventors

UNITED STATES PATENT OFFICE.

FRANCIS G. FLEURY AND EDWARD D. BARKER, OF LONDON, ENGLAND, ASSIGNORS OF ONE-THIRD TO THOMAS DAVIES, OF SAME PLACE.

PROCESS OF AND APPARATUS FOR ROASTING COFFEE.

SPECIFICATION forming part of Letters Patent No. 255,965, dated April 4, 1882.

Application filed April 6, 1881. (No model.) Patented in England June 24, 1880, and in France December 24, 1880.

*To all whom it may concern:*

Be it known that we, FRANCIS GEORGE FLEURY and EDWARD DUNNING BARKER, both of Bedford Row, London, England, have invented certain Improvements in the Process of and in Apparatus for Roasting Coffee, of which the following is a specification.

In order to make clear the nature and object of our improved process of roasting coffee, it should be stated that in the process of coffee-roasting as at present in vogue the raw material is placed in vessels which are subjected to a considerable amount of heat for a short period. During its roasting samples are obtained in order to judge of the right moment to stop off the heat, and when it is considered expedient to stop the roasting process the contents of the vessel are emptied into sieves or coolers, and from thence into sacks. As, however, no attempt is made in these roasting-vessels to render them steam-tight, but rather the reverse, a great loss in weight is sustained in this process, due entirely to the evaporation of the water, volatile liquids, and essential oils contained in the berries. This loss generally averages from eighteen to twenty pounds in the hundred-weight, so that if the yield of, say, one hundred-weight of coffee roasted in this way is ninety-two pounds it is deemed rather satisfactory than otherwise. In our improved system of roasting the raw material is inclosed in a cylinder practically steam-tight and capable of withstanding a considerable internal pressure. Before commencing to roast this vessel is in addition charged with compressed air, carbonic acid, or other innocuous gas under a pressure in excess of that of the atmosphere, and the roasting is carried on under this superinduced pressure.

To test the process of roasting we withdraw from time to time samples of the coffee-berries by means of a testing-instrument, and when it is found by an inspection of the samples that the roasting has been carried on sufficiently far the contents of the cylinder are discharged into a suitable receiver.

By this process it is found that a great saving in the weight of the product is effected, and the escape, during roasting, of the volatile essential oil, which imparts to coffee its agreeable aroma, is prevented.

In the accompanying drawings we have shown in several views an arrangement of apparatus by which our improved process of roasting coffee may be efficiently carried out.

Figure 2:
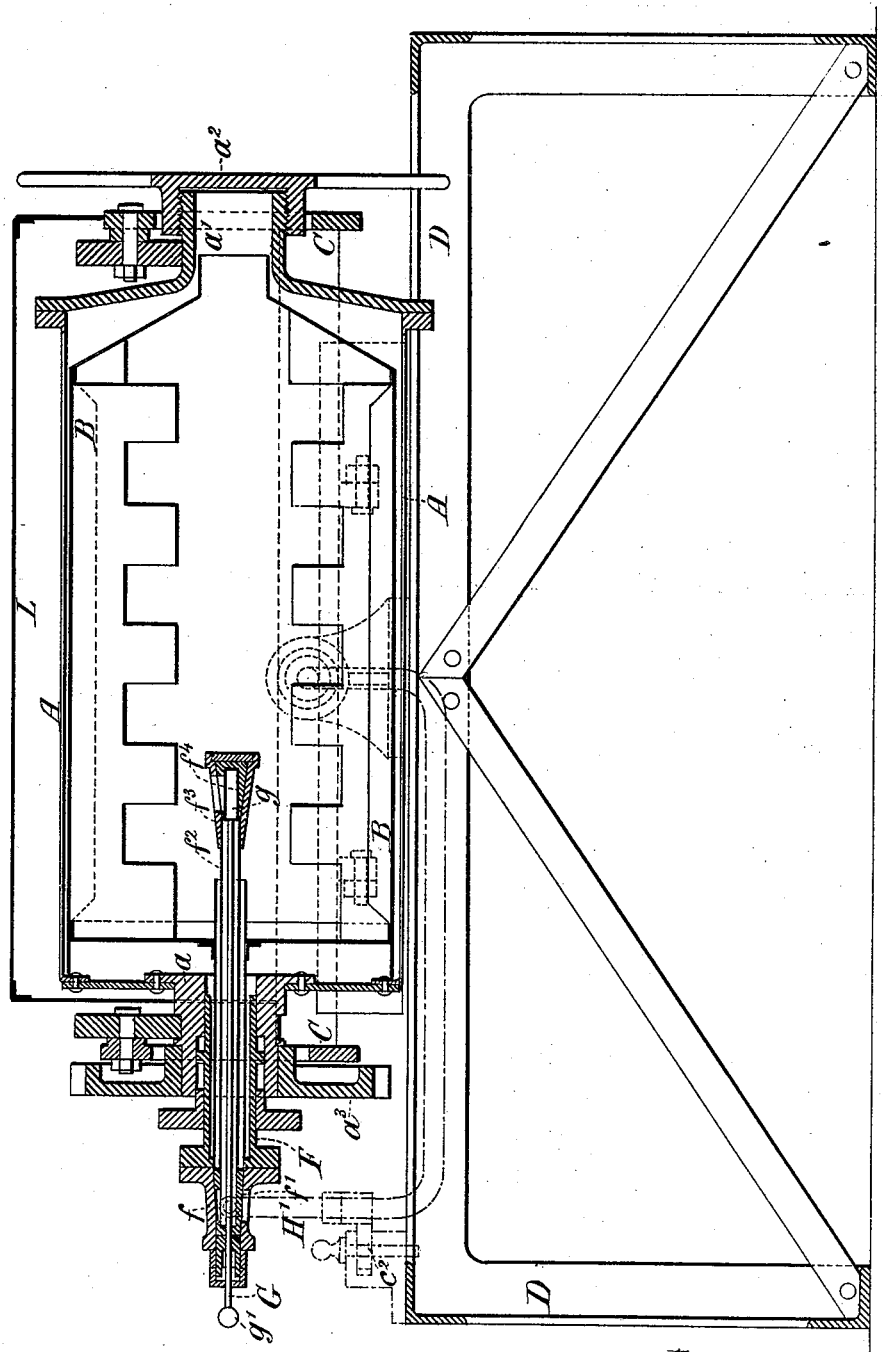
Figure 3:
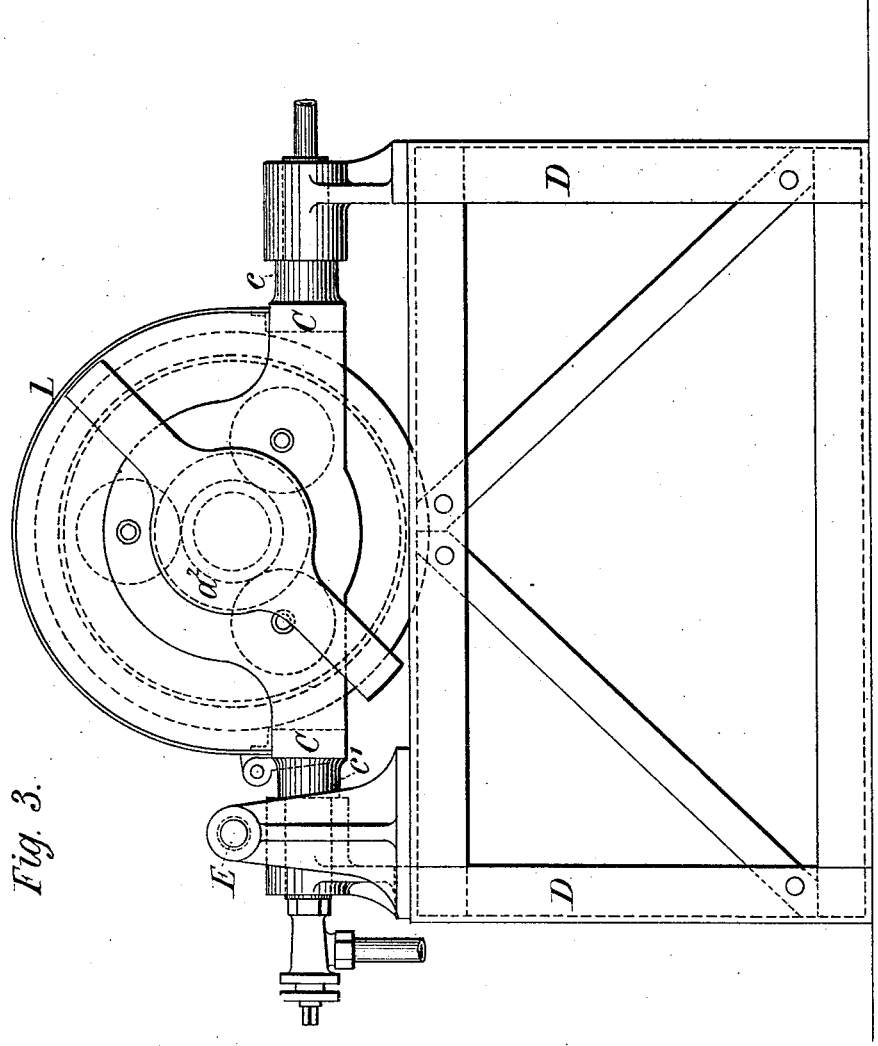
Figure 4:
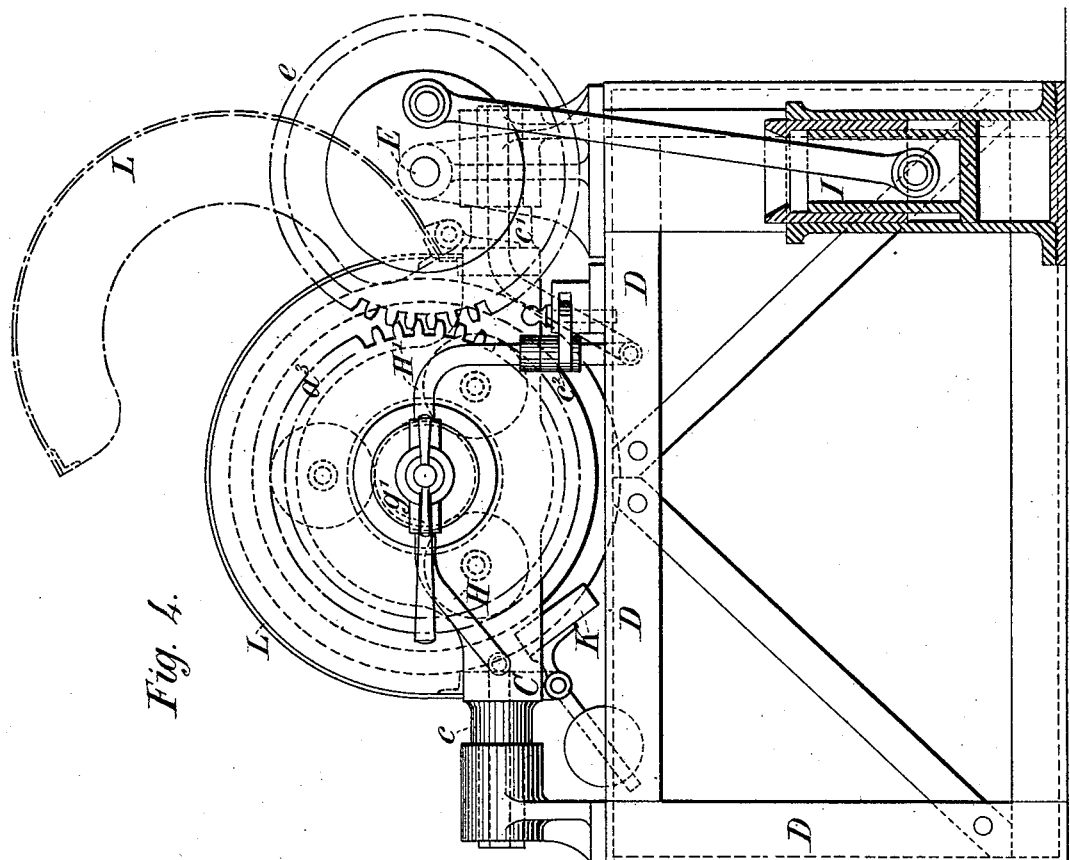

Figure 1 is a plan view of the apparatus complete. Fig. 2 is a longitudinal vertical section taken in the line 1 2 of Fig. 1. Fig. 3 is a right-hand end elevation of the apparatus, and Fig. 4 is a left-hand end elevation of the same.

In these figures, A is the steam-tight roasting-cylinder, formed of plate-iron, and provided with a copper lining, B. This lining is coned at one end (see Fig. 2) to constitute a funnel-connection with the hollow journal of the cylinder, by which the coffee is admitted to and discharged from the cylinder. The lining B is provided with blades, which extend the whole length of the lining, and serve as the cylinder rotates to turn over the coffee and expose it all equally to the heat applied to the cylinder.

Figure 5:
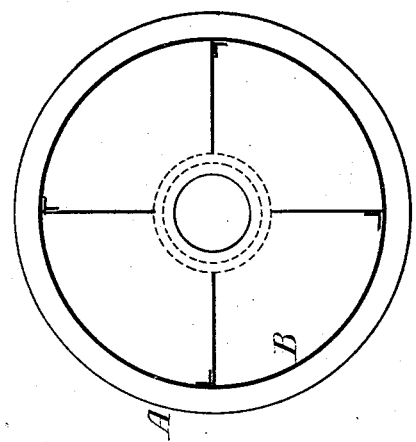

Fig. 5 is a cross-section of the cylinder and its lining, showing also the situation of the blades, which converge toward the axis of the cylinder. This cylinder is mounted on a skeleton-framing, C, it being provided at its opposite ends with hollow journals $a$ $a'$, which turn in roller-bearings in the frame C. This frame is fitted at the middle of its length with hollow trunnions $c$ $c'$, which rest in bearings in the main frame D. The object of thus mounting the cylinder A is to allow of its being turned either end upward for the purpose of charging it with coffee-berries through the journals $a'$ and of discharging the berries when roasted through the same journal. This journal is closed by means of a screw-cap, $a^2$, which is removed for the purpose of charging or of discharging the cylinder.

Keyed to the journal $a$ is a spur-wheel, $a^3$, through which rotary motion is imparted to the cylinder. This wheel $a^3$ gears into a spur-wheel, $e$, keyed onto the driving-shaft E, which is provided with driving-pulleys for receiving a band from any prime mover.

The shaft E has its bearings in the main frame

D. The journal $a$ is fitted with a gland to receive a stationary tube, F, which is cast with a flange to carry a conical box, $f$. In this conical box is fitted a hollow plug, $f'$, and in the plug and box are formed lateral openings, which are brought into coincidence for the purpose to be presently explained. Attached centrally to this plug $f'$ is a tube, $f^2$, which extends into the cylinder A and is closed by a conical shell, $f^3$. Fitting into this shell is a conical plug, $f^4$, which is bored to correspond with the tube $f^2$, but is formed with an internal projection for the purpose to be presently explained. Lateral openings are made in the shell and its plug to allow of the entrance of a sample of the berries when the openings are brought into coincidence.

G is a test-rod, provided at one end with a receiver, $g$, of a cylindrical form, and fitting like a plug the tube $f^2$. A portion of the side of this cylinder is cut away for the purpose of engaging with the projection within the plug $f^4$, and also for bringing the cylinder into communication with the openings in the plug and the shell $f^3$.

The outer end of the test-rod G is furnished with a handle, $g'$, for moving it in and out of the tube $f^2$, and imparting to it an axial motion for the purpose of operating the plug $f^4$, and opening it to and closing it from connection with the chamber. When the receiver of the test-rod is charged it is drawn outward, a packing being provided in the conical box $f$ to prevent the admission or escape of air, and when the cylinder $g$ has entered the hollow plug $f'$ the latter is turned by a handle provided for the purpose to permit the discharge of the sample through the opening in the conical box $f$. This box $f$ is cast with hollow projections on its sides to form couplings for two pipes, H H', which connect it with the hollow trunnions $c$ $c'$ to the frame C. In connection with these hollow projections of the box $f$ passages are cored out in the box to open a communication with the pipes H H' and the interior of the cylinder A. The passage $h$, leading from the pipe H, enters an annular passage in the journal $a$, formed by the insertion of a tube within that journal. The passage $h'$ communicates with a concentric annular passage in the journal $a$ immediately surrounding the tube $f^2$. This arrangement is provided for the admission to the cylinder of compressed air or gas by the one pipe, H, and the discharge of the same, when the roasting is completed, by the other pipe, H'. The compressed air or gas is forced into the cylinder at twenty pounds to the square inch (preparatory to commencing the roasting process) by means of a force-pump, I, which is in connection with the trunnion $c$, and a stop-cock or valve, $h^2$, is fitted to the trunnion $c'$ for preventing the escape of the air or gas while the operation is proceeding.

Situate under the cylinder A is a series of gas jets or burners, K, (see Fig. 4,) extending the whole length of the cylinder, the heat from which is directed onto the cylinder as it slowly rotates, and is caused to circulate over a large portion of its periphery by means of the hinged segment-shaped shield L, overlying the cylinder.

We employ a heat of from 300° Fahrenheit to 360° in roasting, and as the roasting proceeds the compressed air or gas, which is confined in the cylinder by the cock $h^2$, expands under the increasing heat until an internal pressure of one hundred pounds to the square inch (more or less) is obtained. It will therefore be necessary to provide in the construction of the cylinder for a resistance of a great internal pressure.

When the roasting is completed, which the attendant will determine by the tests taken, as already explained, the shield will be thrown back to the dotted position of Fig. 4, and the cylinder is then to be tipped into a vertical position, the hollow journal $a'$ being downward. By the removal of the cap $a^2$ the roasted coffee in a heated state will run out at the hollow journal $a'$ and enter a suitable receiver placed below the cylinder, where it is to be cooled in any convenient manner.

To prevent the oscillation of the frame C when the apparatus is at work a catch, $c^2$, is provided for locking into fixed projections on the main frame D.

We are aware that it is old to preserve wood against climatic influences by inclosing it in an air-tight chamber filled with air or gas under pressure and heating the same to drive all the air out of the pores of the wood.

We are also aware that it is old to employ a rotary perforated shell in which the coffee is placed and which is inclosed within an air-tight retort, which has a pipe leading from its upper to its lower part to provide for returning the aroma given off during roasting to the coffee.

We are also aware that it is old to roast coffee in an air-tight cylinder and to condense the aroma given off during roasting and return such condensed aroma to the coffee to reunite therewith after roasting.

We are also aware that coffee has been browned and roasted by placing the coffee in an inner vessel and admitting steam of a high temperature to another inclosing-vessel, and also that coffee has been roasted in air-tight chambers or vessels of various kinds with the purpose of retaining the aroma.

We do not claim any of the above-mentioned processes or apparatus as included in our invention.

Having now set forth the nature of our invention of improvements in roasting coffee and in apparatus therefor, and explained the manner of carrying the same into effect, we wish it to be understood that we claim—

1. The improvement in the process of roasting coffee consisting in charging the roasting-cylinder with compressed air or gas under a pressure in excess of the atmospheric pressure before the roasting commences, whereby the volatile liquids and essential oils contained in the coffee and ordinarily vaporized and expelled by the roasting-heat will be retained in great part in the berry itself, substantially as herein described.

2. The air-tight rotating roasting cylinder or vessel A B, provided with hollow journals $a\,a'$ for respectively admitting and discharging the coffee-berries and the compressed air or gas used to retain the volatile liquids and essential oils contained in the berries, such cylinder being mounted in the skeleton-frame C, provided with hollow trunnions $c\,c'$ for the passage through them of the air-pipes H H', such cylinder being, moreover, furnished with a tube, $f^2$, closed at its inner end by a laterally-slotted conical shell, $f^3$, into which fits a similarly-slotted plug, $f^4$, bored to admit the receiver $g$, attached to the test-rod G, which rod serves to withdraw samples from time to time during the roasting operation, as set forth.

London, March 12, 1881.

FRANCIS G. FLEURY.
EDWARD D. BARKER.

Witnesses:
H. K. WHITE,
GEO. CANTLE,
    Both of 66 Chancery Lane, London.